United States Patent
Hayes et al.

(10) Patent No.: US 10,769,631 B2
(45) Date of Patent: Sep. 8, 2020

(54) PROVIDING PAYMENT CREDENTIALS SECURELY FOR TELEPHONE ORDER TRANSACTIONS

(71) Applicant: MasterCard International Incorporated, Purchase, NY (US)

(72) Inventors: Joseph Hayes, Montclair, NJ (US); Prashant Sharma, Madison, NJ (US); Simon Collins, Guildford (GB)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 777 days.

(21) Appl. No.: 15/348,176

(22) Filed: Nov. 10, 2016

(65) Prior Publication Data

US 2018/0130060 A1     May 10, 2018

(51) Int. Cl.
   *G06Q 30/00*    (2012.01)
   *G06Q 20/40*    (2012.01)
   *G06Q 30/06*    (2012.01)
   *G06Q 20/00*    (2012.01)

(52) U.S. Cl.
   CPC ......... *G06Q 20/4014* (2013.01); *G06Q 20/00* (2013.01); *G06Q 30/0633* (2013.01)

(58) Field of Classification Search
   CPC .......... G06Q 20/322; G06Q 20/3821; G06Q 20/3829; G06Q 20/4014; G06Q 30/0633; G06Q 20/4016
   See application file for complete search history.

(56) References Cited

U.S. PATENT DOCUMENTS

| | | | | |
|---|---|---|---|---|
| 2005/0234778 A1* | 10/2005 | Sperduti | ............... | G06Q 20/20 705/22 |
| 2008/0257958 A1* | 10/2008 | Rothwell | ............... | G06Q 20/20 235/380 |
| 2010/0020946 A1* | 1/2010 | Jackson | ................ | G06Q 20/10 379/88.04 |
| 2012/0278236 A1* | 11/2012 | Jain | .................... | G06Q 20/3221 705/44 |
| 2014/0258123 A1* | 9/2014 | Fernandes | ........... | G06Q 40/025 705/44 |

(Continued)

OTHER PUBLICATIONS

"EMV Payment Tokenisation Specification", Technical Framework, Version 1.0, Mar. 2014, retrieved Nov. 10, 2016, download from www.emvco.com, 84pgs.

*Primary Examiner* — Mila Airapetian
(74) *Attorney, Agent, or Firm* — Buckley, Maschoff & Talwalkar LLC

(57) ABSTRACT

A method includes receiving a purchase order via a telephone call from a customer. As part of the phone call, a credentials service customer identifier assigned to the customer is received from the customer. The method further includes transmitting a message to a credentials service that issued the customer identifier. Payment credentials are received from the credentials service. The payment credentials include a payment token that is associated with a payment account that belongs to the customer. The method further includes generating a payment account system authorization request message. The authorization request message includes the payment token. In addition, the method includes transmitting the authorization request message for routing to an issuer of the payment account.

3 Claims, 9 Drawing Sheets

(56) References Cited

U.S. PATENT DOCUMENTS

2015/0317613 A1* 11/2015 Clark .................... G06Q 20/12
  705/44
2016/0110709 A1* 4/2016 Lacoss-Arnold ...... G06Q 20/02
  705/75

* cited by examiner

PROVIDING PAYMENT CREDENTIALS SECURELY FOR TELEPHONE ORDER TRANSACTIONS

BACKGROUND

FIG. 1 is a block diagram that illustrates a conventional payment system 100.

The system 100 includes a conventional payment card/device 102. As is familiar to those who are skilled in the art, the payment card/device 102 may be a magnetic stripe card, an IC (integrated circuit) card, a fob, a payment-enabled smartphone, etc. The payment card/device 102 is shown being carried and used by an account holder/user 103.

The system 100 further includes a reader component 104 associated with a POS terminal 106. In some known manner (depending on the type of the payment card/device 102) the reader component 104 is capable of reading the payment account number and other information from the payment card/device 102.

The reader component 104 and the POS terminal 106 may be located at the premises of a retail store and operated by a sales associate of the retailer for the purpose of processing retail transactions. The payment card/device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment account issuer server computer 112 may be operated by or on behalf of a financial institution ("FI") that issues payment accounts to individual users. For example, the payment account issuer server computer 112 may perform such functions as (a) receiving and responding to requests for authorization of payment account transactions to be charged to payment accounts issued by the FI; (b) tracking and storing transactions and maintaining account records; (c) rendering periodic account statements; and (d) receiving and tracking payments to the issuer from the account holders.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated reader components. The system may also include a very large number of payment account holders, who carry payment cards or other devices for initiating payment transactions by presenting an associated payment account number to the reader component of a POS terminal.

Still further, and as is well-known, for e-commerce transactions, an e-commerce server computer (not shown) may function as the POS terminal. The e-commerce server computer may be operated by or on behalf of a merchant and may be accessed by the account holder via a browser program running on (for example) a personal computer (not shown) or a smartphone (not shown apart from payment device 102). To arrange for the payment portion of the e-commerce transaction, the account holder may manually enter a payment account number, or authorize a charge from a payment account number held on file by the merchant, or access a digital wallet, etc.

Another type of payment account transaction may take place when a customer contacts a merchant by telephone to purchase one or more items. For example, the customer may have received a catalog in the mail and may have seen one or more items in the catalog that that customer desires to purchase. Typically a toll-free telephone number is indicated in the catalog, and allows the customer to phone in to a call center that takes customer orders. In general, a typical transaction involves the customer speaking with a call center customer service representative (CSR) to communicate the item number or numbers for the catalog items that the customer wishes to purchase. If a catalog had been sent to the customer by the merchant, the customer is identified in the merchant's records and the shipping address as stated in the merchant's records is confirmed with the customer. In addition, it is customary for the customer to read off his/her payment card account number and related information to the call center customer service representative so that the representative can enter the payment account information into the merchant's ordering system, to allow the transaction to be charged to the customer's payment account. However, there are some consumers who have doubts about the security of their payment card information when the above phone ordering procedure is followed. This concern on the part of some consumers may deter them from placing telephone orders and may reduce the effectiveness of catalog-based marketing strategies. Likewise, questions about the security of payment account numbers may deter customers from calling service providers (e.g., utility companies, mobile telephone providers) to provide their payment account numbers to settle pending bills from the service providers.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, payment credentials are provided in a secure manner to a merchant in connection with a telephone order. Consumers pre-register their payment account information with a credentials service and are each assigned a unique identification code (also referred to as a customer identifier). When a participant in the credentials service engages in a telephone order transaction, the participant/customer provides his/her credentials service customer identifier to the merchant instead of providing a payment account number. The merchant contacts the credentials service and communicates the customer identifier to the credentials service. The credentials service gets in touch with the customer to receive the customer's approval for the transaction. The credentials service then provides a secure payment token to the merchant, with the payment token standing in for the customer's payment account number. The merchant then uses the payment token to launch a tokenized payment account system transaction.

Figure 1:
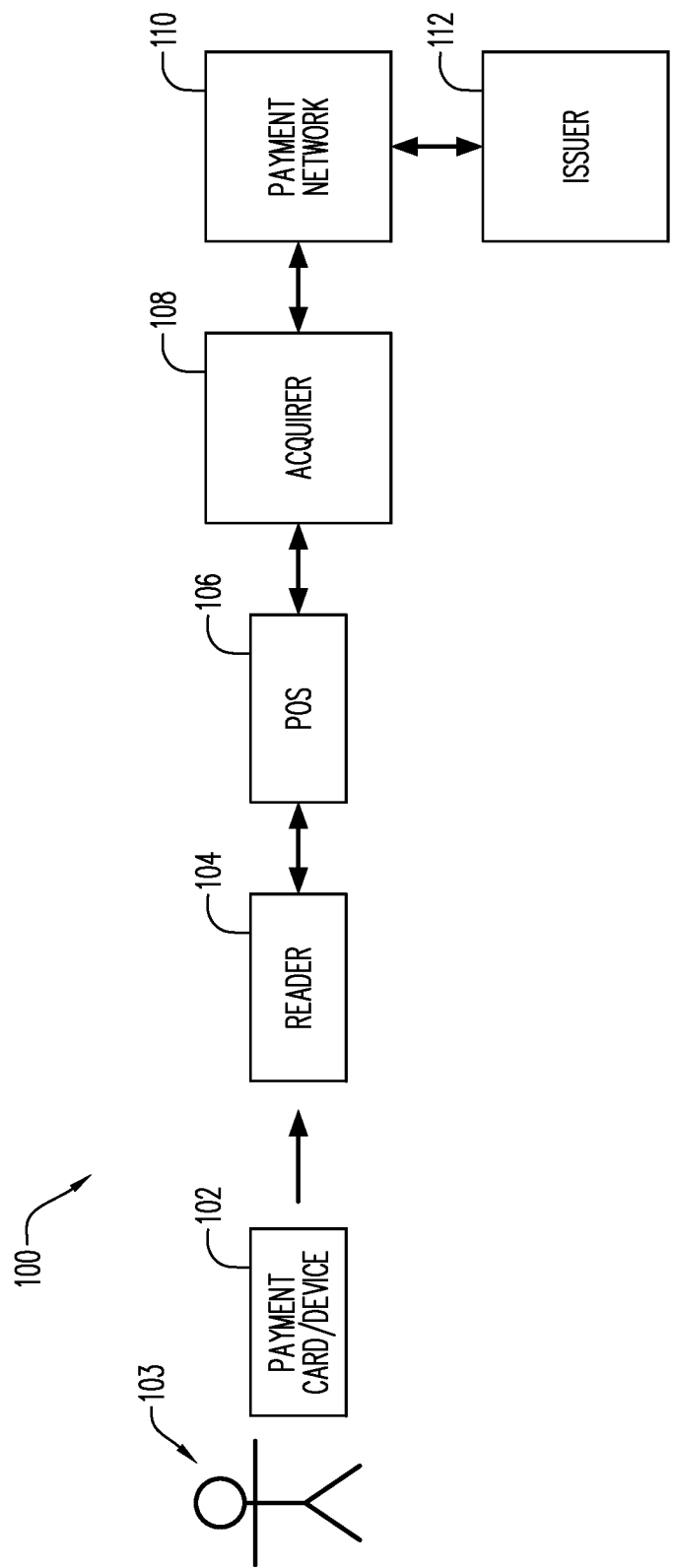
FIG. 1 is a block diagram that illustrates a conventional payment account system.
Figure 2:
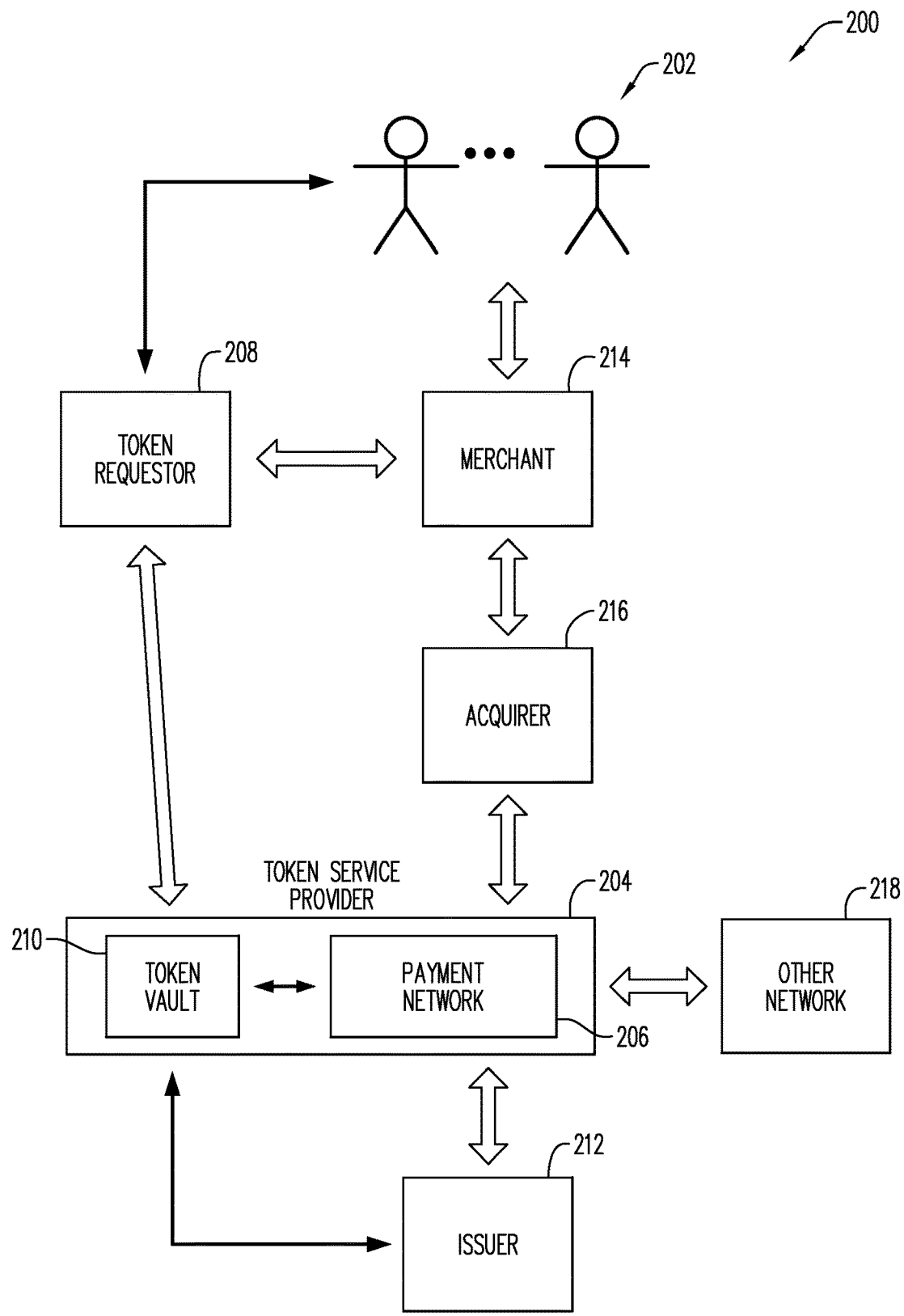
FIG. 2 is a block diagram of a conventional payment system in which payment tokens are substituted for payment account numbers in some aspects of transaction initiation and processing.

By way of background to more specific teachings of this disclosure, an explanation will now be provided—with reference to FIG. 2—concerning the concept of "tokenization" as it relates to payment account systems. FIG. 2 is a block diagram of a conventional payment system in which payment tokens are substituted for payment account numbers in some aspects of transaction initiation and processing. FIG. 2 is adapted from the "FIG. 1" presented on page 10 of the Payment Token Interoperability Standard, which was issued by Mastercard International Incorporated (the assignee hereof), Visa and American Express in November 2013. Reference is also made to the EMV® Payment Tokenisation Specification, published March 2014, and available for downloading.

A payment system featuring tokenization is generally indicated by reference numeral 200 in FIG. 2.

Individual users/cardholders are indicated by reference numeral 202 in FIG. 2. As is familiar to the reader, the vast majority of the users 202 may habitually carry with them mobile devices such as smartphones, tablet computers, or the like. (To simplify the drawing, these devices are not explicitly shown.) It is assumed that many of the mobile devices may be provisioned with respective payment tokens, in accordance with at least one use case described in the Payment Token Interoperability Standard.

FIG. 2 also includes a block 204 that represents a token service provider. The token service provider 204 may in some embodiments also be the operator of a payment network (block 206), such as the well-known Banknet® system operated by MasterCard International Incorporated, the assignee hereof. The token service provider 204 may be authorized in the system 200 to issue tokens. The payment tokens may be issued to token requestors such as the token requestor represented by block 208 in FIG. 2. (As set forth in the Payment Token Interoperability Standard, token requestors may, for example, include payment card account issuers; card-on-file merchants; acquirers, acquirer-processors, etc.; original equipment manufacturer (OEM) device manufacturers; and digital wallet providers). Each token requestor 208 may be required to register with the token service provider 204.

In issuing tokens, the token service provider 204 may perform such functions as operating and maintaining a token vault 210, generating and issuing payment tokens, assuring security and proper controls, token provisioning (e.g., provisioning NFC-capable mobile devices with token values; personalizing payment cards with token values), and registering token requestors.

In addition to representing the token service provider, block 204 should also be understood to represent one or more computer systems operated by the token service provider.

Block 212 in FIG. 2 represents an issuer of payment card accounts held by the cardholders 202. Those who are skilled in the art will understand that the issuer is typically a bank or other financial institution, and may provide banking services to the cardholders 202 in addition to issuing payment card accounts (e.g., credit card accounts, debit card accounts) to the cardholders 202. It was noted above that issuers 212 may also have the role of token requestor (block 208) in the system 200.

Block 214 in FIG. 2 represents a merchant to which the cardholders 202 may present payment devices (payment cards and/or payment-enabled mobile devices—e.g., NFC-enabled and token-provisioned mobile devices, etc., none of which are shown in the drawing) to consummate a purchase transaction. In some cases the merchant 214 may also be a token requestor 208 (e.g., for implementing a tokenized card-on-file arrangement for e-commerce transactions with a cardholder 202). According to previously proposed use cases, the merchant may receive a token value from a cardholder's payment device and issue an authorization request to initiate processing of a payment transaction in the system 200.

Block 216 in FIG. 2 represents an acquirer. As is well known, the acquirer may be a financial institution that provides banking services to the merchant 214, and that receives and routes payment transaction authorization requests originated from the merchant 214.

Also shown in FIG. 2 is a block 218, representing another payment network with which the token service provider 204 may interact.

It will be readily appreciated that a practical embodiment of the system 200 may include numerous merchants, token requestors, acquirers and issuers, rather than one of each as depicted in FIG. 2. It may also be the case that there is more than one token service provider in the system. From the mentions of the issuer 212, payment network 206, acquirer 216 and merchant 214 in connection with FIG. 2, it will be appreciated that the payment system 200 of FIG. 2 is a modified version of the payment system 100 described above in connection with FIG. 1.

As is known to those who are familiar with "tokenization," use of a payment token in place of an actual account number during part of a transaction process, or storing a token rather than an account number in some environments, may help to shield the account number from compromise and may reduce the opportunities for fraudulent activity. Partly this is because attempted misuse of tokens may be more readily detectable than misuse of account numbers themselves. It is also well known that a payment transaction initiated with use of a payment token typically includes a "detokenization" stage, i.e., a stage—occurring within a secure environment—during which the token is translated into the actual account number for the payment account represented by the token.

As will become apparent from further discussion, in accordance with aspects of the present disclosure, a credentials service—as mentioned above and as described in more detail below—may function as a token requestor and may in some embodiments be affiliated with, or under common operation with, a payment network.

Figure 3:
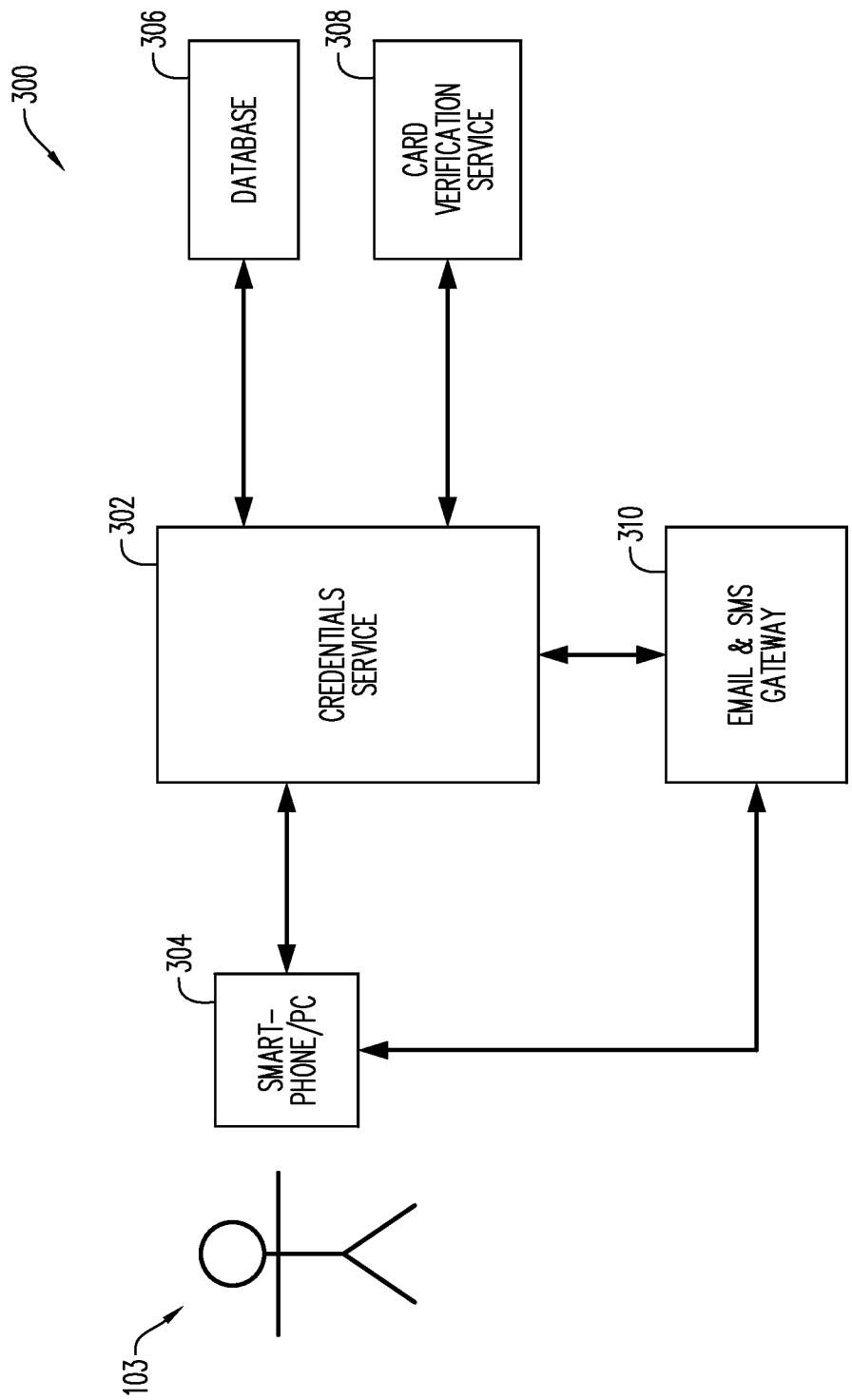
FIG. 3 is a block diagram representation of aspects of a payment system provided according to teachings of the present disclosure.

FIG. 3 is a block diagram that illustrates some aspects of a payment system 300 provided according to aspects of the present disclosure. The portions of the payment system 300 depicted in FIG. 3 are those that are concerned with registration of users with a credentials service 302. A user 103 is shown with a smartphone or PC 304 or like device by which the user 103 may access a registration webpage (not separately shown) maintained by the credentials service 302. (It is to be understood that the block 302 that represents the credentials service may also be taken to represent a server computer operated by the credentials service).

Details of a registration process for the user 103 relative to the credentials service 302 will be described below, particularly with reference to FIG. 8. Continuing for now to refer to FIG. 3, resources that are available to the credentials service server computer 302 in connection with registration of users may include a database 306, a card verification service 308 and an email and/or SMS gateway 310. The database 306 (which in some embodiments may be integrated with the credentials service server computer 302) may serve as a repository of user registrations and related data. The card verification service 308 may allow the credentials service server computer 302 to verify payment card account information submitted by users seeking to register with the credentials service. The email/SMS gateway 310 may facilitate communication with users during the registration process.

Figure 4:
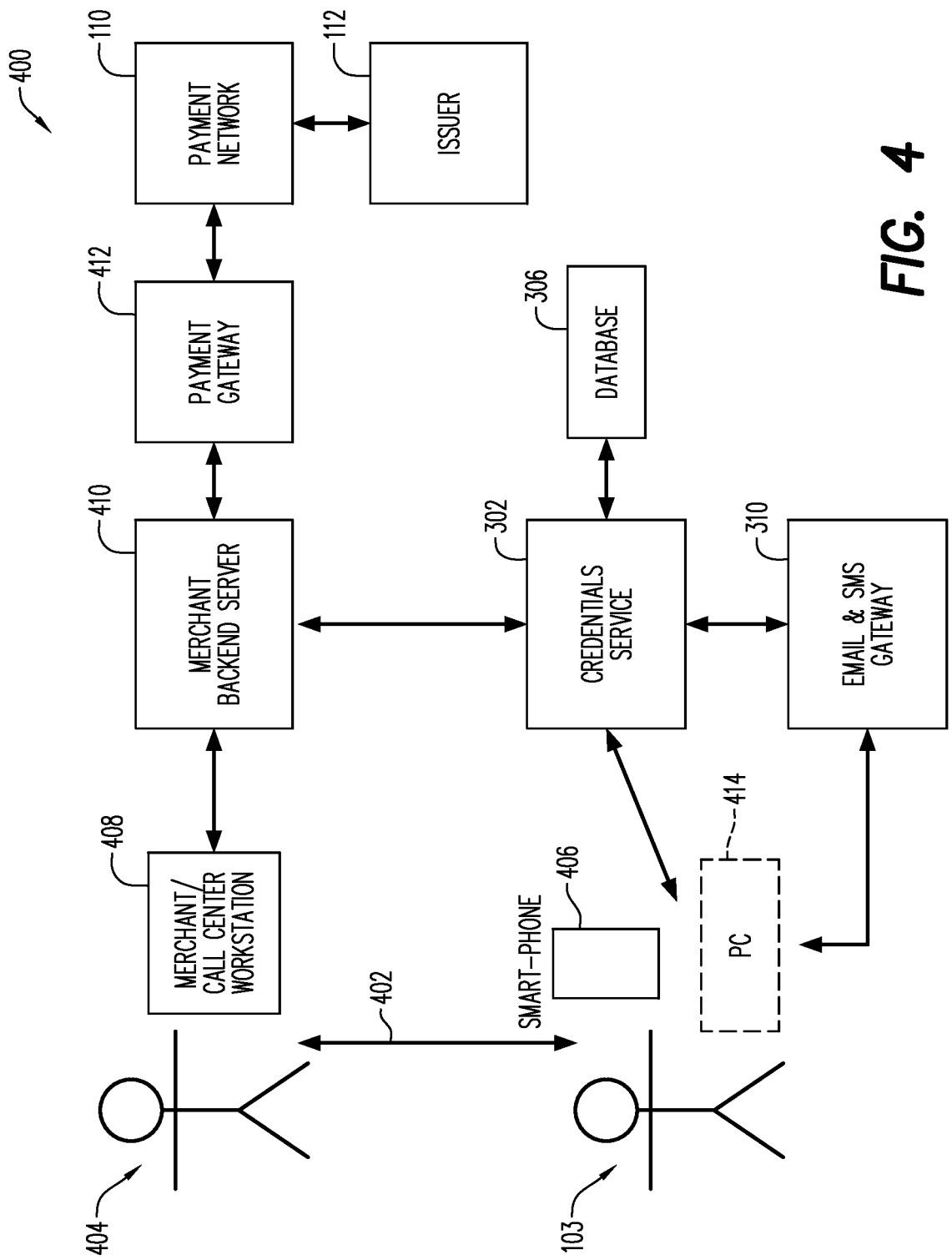
FIG. 4 is a block diagram representation of further aspects of the system partially represented in FIG. 3 and provided according to teachings of the present disclosure.

FIG. 4 is a block diagram 400 that presents an alternative view of the system 300. The depiction of the system 400 in FIG. 4 is illustrative of components required for performing a telephone order transaction in accordance with teachings of the present disclosure.

As in FIG. 3, in FIG. 4 the user/customer 103 is shown, together with the credentials service server computer 302, the database 306 and the email/SMS gateway 310.

Double-ended arrow mark 402 represents a telephone call placed by the user 103 to a merchant call center, represented by a merchant call center customer service representative (CSR) 404, with whom the user 103 engages in conversation via telephone. The call may have been initiated by the user 103 via the user's smartphone 406, for example. The CSR 404 operates a merchant call center workstation 408, which may incorporate a computer terminal (not separately shown) or PC (not separately shown), etc. The workstation 408 may exchange data with a merchant backend computer system 410, which is also shown in FIG. 4, as part of the system 300. The merchant backend computer system 410 may be operative to initiate payment account transaction authorization request messages via a payment gateway 412, which may correspond to, or act on behalf of, a transaction acquirer such as that shown in FIG. 1 at block 108. In the representation of FIG. 4, the payment network 110 and issuer server computer 112 are carried over from the like blocks shown in FIG. 1.

Details of actions taken in performing a telephone order purchase transaction according to teachings of the present disclosure will be described further below, particularly with reference to FIG. 9. As will be seen, when the user 103 is contacted by the credentials service server computer 302, the user may employ, e.g., his/her smartphone 406 or a PC 414 (shown in phantom) to indicate approval of the current phone order transaction.

As was the case with FIG. 1, the depiction of the system 400 in FIG. 4 includes only components required for a single transaction. In a practical embodiment of the system 400, there may be considerable or even very large numbers of some of the components shown to make up the entire system 400.

Figure 5:
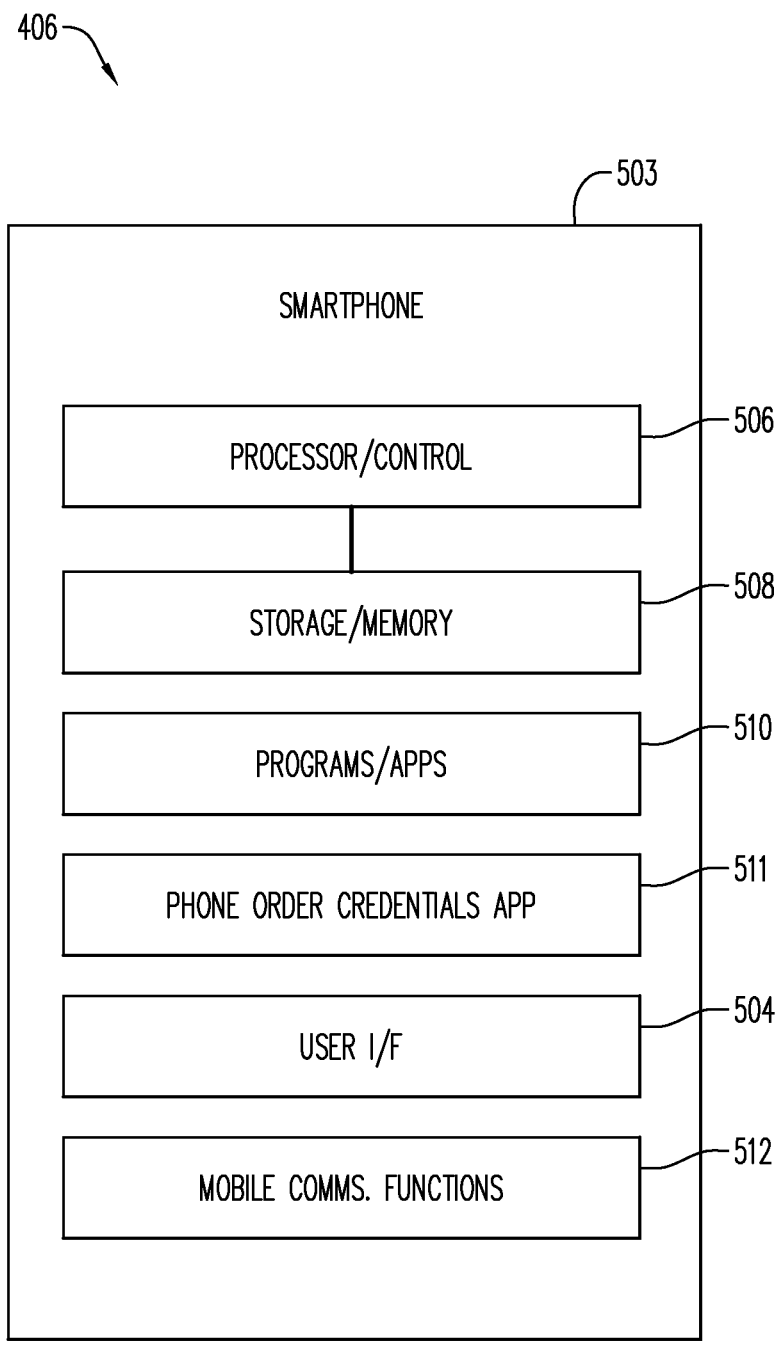
FIG. 5 is a simplified block diagram representation of a smartphone that may play a role in the payment system of FIGS. 3 and 4.

FIG. 5 is a simplified block diagram illustration of the smartphone 406 shown in FIG. 4.

The smartphone 406 may include a housing 503. In many embodiments, the front of the housing 503 is predominantly constituted by a touchscreen (not separately shown), which is a key element of the user interface 504 of the smartphone 406.

The smartphone 406 further includes a mobile processor/control circuit 506, which is contained within the housing 503. Also included in the smartphone 406 is a storage/memory device or devices 508. The storage/memory devices 508 are in communication with the processor/control circuit 506 and may contain program instructions to control the processor/control circuit 506 to manage and perform various functions of the smartphone 406. As is well-known, a device such as smartphone 406 may function as what is in effect a pocket-sized personal computer via programming with a number of application programs, or "apps," as well as a mobile operating system (OS). (The apps are represented at block 510 in FIG. 5, and may, along with other programs, in practice be stored in block 508, to program the processor/control circuit 506).

Also shown in FIG. 5 is a phone order credentials app 511. The phone order credentials app 511 is shown apart from the other apps represented at block 510, due to the particular relevance of the phone order credentials app 511 to the subject of this disclosure. Details of functionality provided by the phone order credentials app 511 will be understood by subsequent discussion of the processes illustrated in FIGS. 8 and 9. In some embodiments, the app 511 may not be present.

As is typical for smartphones, the smartphone 406 may include mobile communications functions as represented by block 512. The mobile communications functions 512 may include voice and data communications via a mobile communication network (not shown) with which the smartphone 406 is registered. Block 512 may thus represent a conventional smartphone antenna, and a transceiver suitable for typical voice and data communication smartphone functions.

From the foregoing discussion, it will be appreciated that the blocks depicted in FIG. 5 as components of the smartphone 406 may in effect overlap with each other, and/or there may be functional connections among the blocks that are not explicitly shown in the drawing. It may also be assumed that, like a typical smartphone, the smartphone 406 may include a rechargeable battery (not shown) that is contained within the housing 503 and that provides electrical power to the active components of the smartphone 406.

Figure 6:
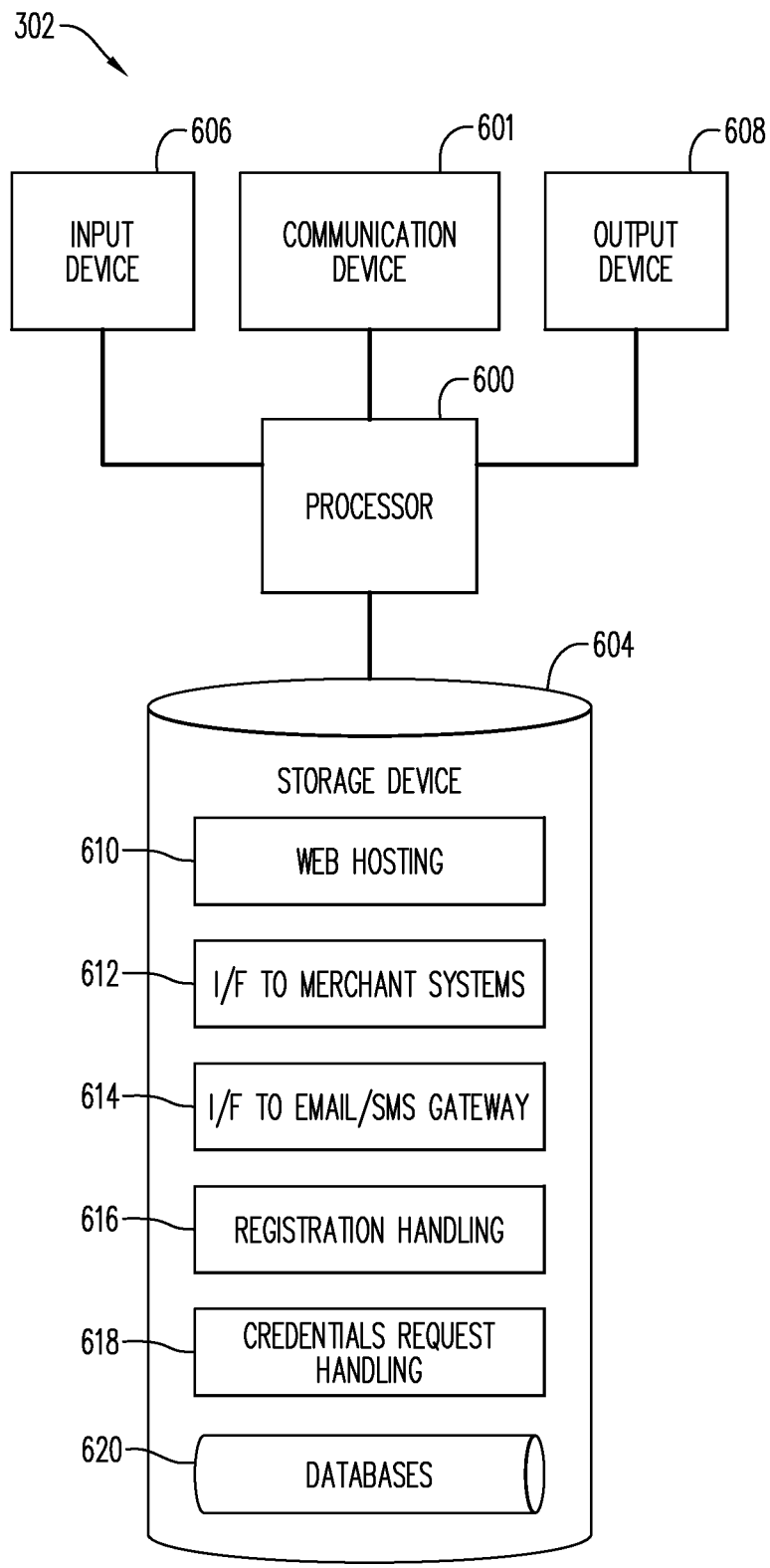
FIGS. 6 and 7 are block diagram representations of computers that may serve as components of the system illustrated in FIGS. 3 and 4.

FIG. 6 is a block diagram representation of an embodiment of the credentials service server computer 302.

In some embodiments, hardware aspects of the credentials service server computer 302 may be constituted by typical server computer hardware, but may be controlled by software to cause it to function as described herein.

The credentials service server computer 302 may include a processor 600 operatively coupled to a communication device 601, a storage device 604, an input device 606 and an output device 608. The communication device 601, the storage device 604, the input device 606 and the output device 608 may all be in communication with the processor 600.

The processor 600 may be constituted by one or more processors. The processor 600 may operate to execute processor-executable steps, contained in program instructions described below, so as to control the credentials service server computer 302 to provide desired functionality.

Communication device 601 may be used to facilitate communication with, for example, other devices (such as merchant servers; user devices). For example, communication device 601 may comprise numerous communication ports (not separately shown), to allow the credentials service server computer 302 to perform its roles in connection with numerous registration requests or phone order transactions.

Input device 606 may comprise one or more of any type of peripheral device typically used to input data into a computer. For example, the input device 606 may include a keyboard and a mouse. Output device 608 may comprise, for example, a display and/or a printer.

Storage device 604 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 604 stores one or more programs for controlling processor 600. The programs comprise program instructions (which may be referred to as computer readable program code means) that contain processor-executable process steps of the credentials service server computer 302, executed by the processor 600 to cause the credentials service server computer 302 to function as described herein.

The programs may include one or more conventional operating systems (not shown) that control the processor 600 so as to manage and coordinate activities and sharing of resources in the credentials service server computer 302, and to serve as a host for application programs (described below) that run on the credentials service server computer 302.

The programs stored in the storage device 604 may also include a web hosting application program 610. The web hosting application program may be generally conventional, but configured to control the processor 600 such that the credentials service server computer 302 hosts a user registration website as described herein.

Further, the storage device 604 may store a software interface to merchant systems 612 that facilitates communications between the credentials service server computer 302 and merchant computer systems like the backend server 410 shown in FIG. 4.

Continuing to refer to FIG. 6, the storage device 604 may also store a software interface to email/SMS gateway 614 that facilitates communications engaged in by the credentials service server computer 302 with user devices via the email/SMS gateway 310 (FIGS. 3 and 4).

In addition, and referring still to FIG. 6, there may also be stored in the storage device 604 a registration request handling application program 616 that controls the processor 600 to enable the credentials service server computer 302 to respond to and fulfill user registration requests as described herein (particularly with respect to FIG. 8, below).

Moreover, the storage device 604 may still further store a credentials request handling application program 618. The credentials request handling application program 618 may control the processor 600 such that the credentials service server computer 302 provides functionality as described herein (particularly in regard to FIG. 9) in connection with requests from merchant computers for payment credentials to be employed in telephone orders received by merchants.

The storage device 604 may also store, and the credentials service server computer 302 may also execute, other programs, which are not shown. For example, such programs may include a reporting application, which may respond to requests from system administrators for reports on the activities performed by the credentials service server computer 302. The other programs may also include, e.g., device drivers, database management programs, communications software, etc.

The storage device 604 may also store one or more databases 620 required for operation of the credentials service server computer 302. In some embodiments, the credentials service server computer 302 and the database 306 shown in FIGS. 3 and 4 may be at least partially integrated, in which case the database 306 may be at least partially constituted by block 620 in FIG. 6.

Figure 7:
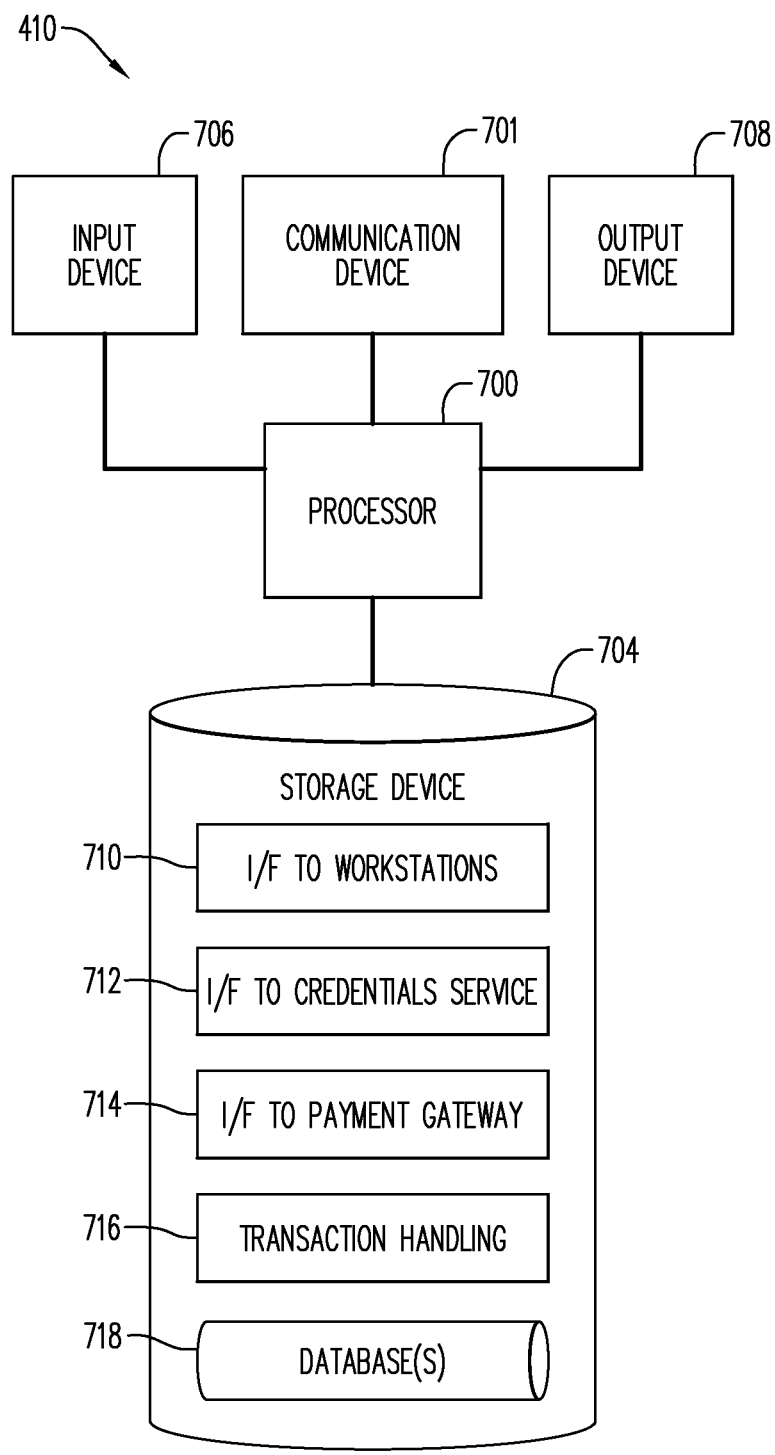

FIG. 7 is a block diagram of an embodiment of the merchant backend server computer 410.

In its hardware architecture and components, the merchant backend server computer 410 may, for example, resemble the hardware architecture and components described above in connection with FIG. 6. However, the merchant backend server computer 410 may be programmed differently from the credentials service server computer 302 so as to provide different functionality.

Returning again to the hardware aspects of the merchant backend server computer 410, it may include a processor 700, a communication device 701, a storage device 704, an input device 706 and an output device 708. The communication device 701, the storage device 704, the input device 706 and the output device 708 may all be in communication with the processor 700.

The above descriptions of the hardware components shown in FIG. 6 may, in some embodiments, also be applicable to the like-named components shown in FIG. 7.

Storage device 704 stores one or more programs for controlling processor 700. The programs comprise program instructions (which may be referred to as computer readable program code means) that contain processor-executable process steps of the merchant backend server computer 410, executed by the processor 700 to cause the merchant backend server computer 410 to function as described herein.

The programs may include one or more conventional operating systems (not shown) that control the processor 700 so as to manage and coordinate activities and sharing of resources in the merchant backend server computer 410, and to serve as a host for application programs (described below) that run on the merchant backend server computer 410.

The programs stored in the storage device 704 may include a software interface to workstations 710 that controls the processor 700 to support interactions between the merchant backend server computer 410 and a number of call center workstations such as the workstation 408 shown in FIG. 4.

Further, the storage device 704 may store a software interface to credentials service 712 that controls the processor 700 to support interactions between the merchant backend server computer 410 and the credentials service server computer 302.

Moreover, the storage device 704 may store a software interface to payment gateway 714 that controls the processor 700 to support interaction between the merchant backend server computer 410 and the payment gateway 412 (FIG. 4).

In addition, the storage device 704 may also store a transaction handling program 716 that controls the processor 700 such that the merchant backend server computer 410 handles telephone order transactions in a manner that will be described below, particularly with reference to FIG. 9.

The storage device 704 may also store, and the merchant backend server computer 410 may also execute, other programs, which are not shown. For example, such programs may include a reporting application, which may respond to requests from system administrators for reports on the activities performed by the merchant backend server computer 410. The other programs may also include, e.g., device drivers, database management programs, communication software, etc.

The storage device 704 may also store one or more databases 718 as required for operation of the merchant backend server computer 410.

Figure 8:
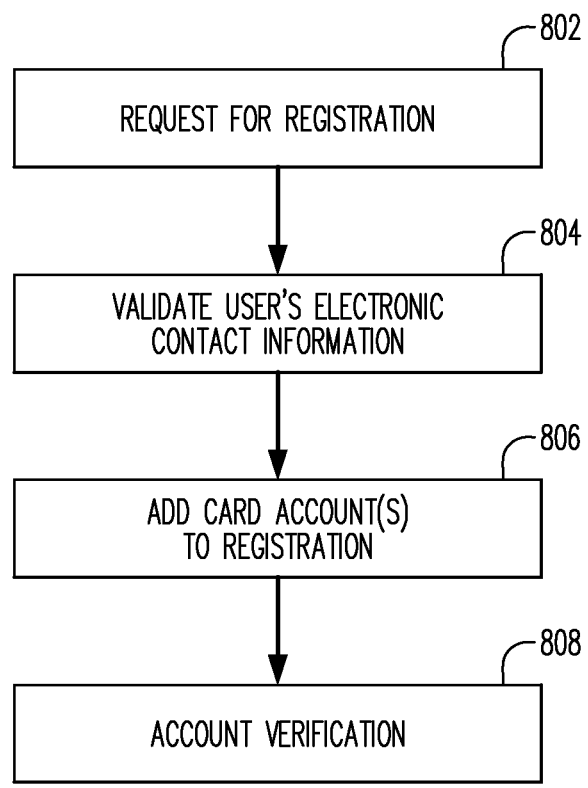
FIGS. 8 and 9 are flow charts that illustrate processes that may be performed in the system of FIGS. 3 and 4 according to aspects of the present disclosure.

FIG. 8 is a flow chart that illustrates a process that may be performed in the systems 300 and 400 (FIGS. 3 and 4) in accordance with aspects of the present disclosure. In particular, the process illustrated in FIG. 8 is concerned with user registration, and the view of the system 300 as seen in FIG. 3 is of particular relevance.

At 802 in FIG. 8, the user 103 (FIG. 3) communicates with the credentials service server computer 302 to request registration with the credentials service that operates the computer 302. For example, the user may operate a mobile device (smartphone/tablet computer) that runs a mobile browser, or a PC the runs a browser program (such devices being represented by block 304 in FIG. 3) to access a user registration website (not separately shown) hosted by the credentials service server computer 302. Using the device 304, the user 103 may interact with the registration website to enter such basic information as the user's name and address, and electronic messaging address/contact information such as the user's email address and/or mobile telephone number. In some embodiments the registration website may request additional information from the user for security/demographic/marketing purposes.

In response to the user's entering of the required information, the credentials service server computer 302 may validate at least one aspect of the user's electronic contact information (block 804 in FIG. 8). This may include validating either or both of the user's email address and mobile phone number. For example, the credentials service server computer 302 may send a message using the email address or mobile phone number just entered (via the email/SMS gateway 310) to request that the user respond to confirm that the message was properly received.

At this point, the user may be deemed registered and an account/data partition may be established for the user, including a data entry for the user in the database 306 (FIG. 3).

As an additional part of the registration process, a unique customer identifier may be assigned to the user for use in the operations of the credentials service server computer 302 and in seeking payment credentials from the credentials service server computer 302 during telephone order transactions. The credentials service server computer 302 may generate and assign the customer identifier or alternatively the user may select a customer identifier. In some cases, the user may select a base portion of the customer identifier and the credentials service server computer 302 may add a prefix or suffix to assure that the identifier is unique.

At block 806 in FIG. 8, the customer may "add a card" (i.e., submit payment account information) to be associated by the credentials service server computer 302/database 306 with the user's registration/account with the credentials service. For example, the user may submit one or more PANs (primary account numbers) corresponding to at least some of the user's payment accounts. This may be done via the user interacting with the website hosted by the credentials service server computer 302 or via a credentials server mobile app (block 511, FIG. 5) that has been downloaded to the user's smartphone/tablet.

At block 808, the credentials service server computer 302 may verify the added account(s) via request to and response from the card verification service 308. This service may route requests for verification to the account issuers. Once the card is verified, it will be "tokenized" and added to the user's account.

If more than one card account is added to the user's registration, the user may be prompted to designate one of the accounts as a "default" account, or the first account added may automatically be considered the default account.

Figure 9:
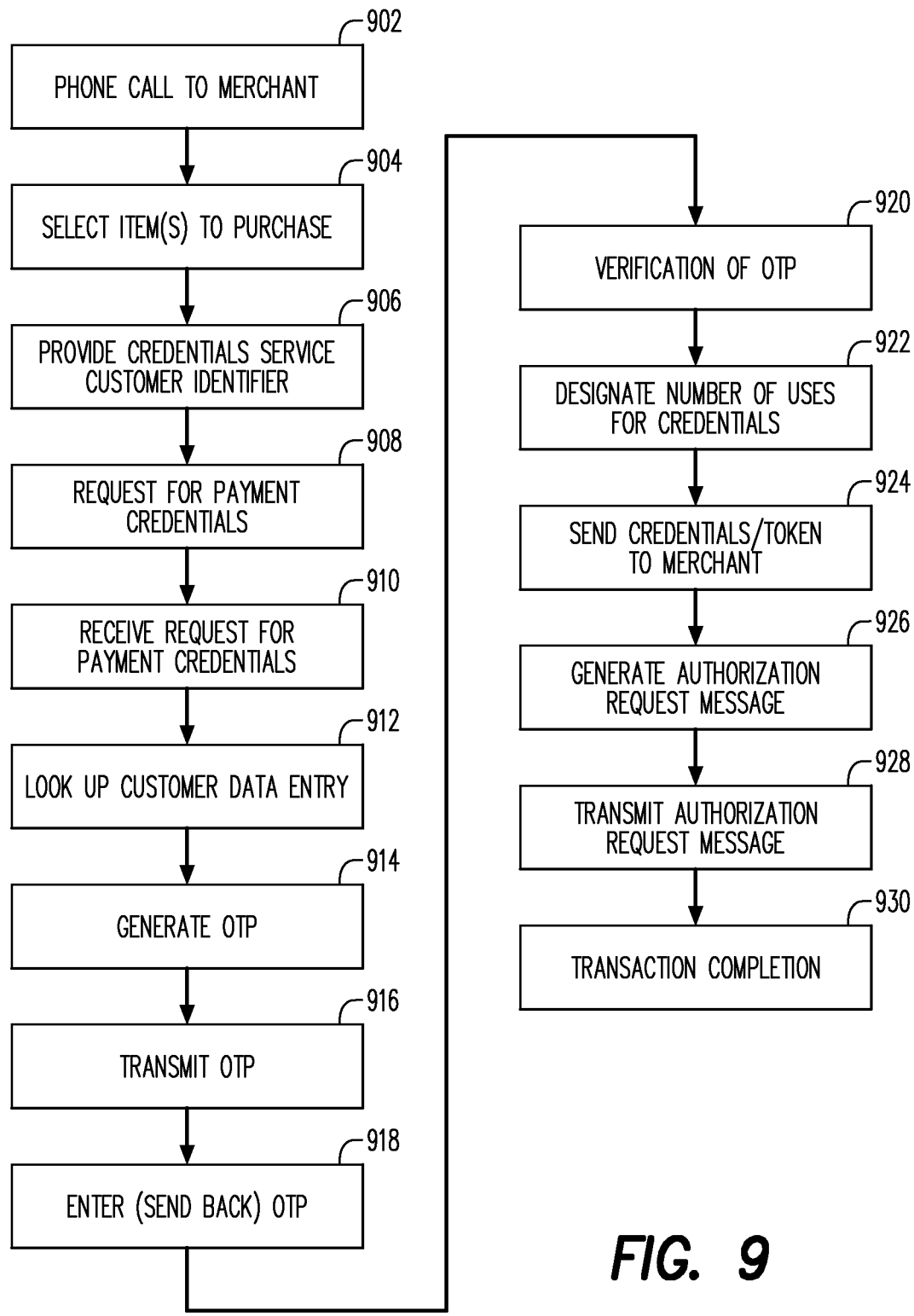

FIG. 9 is a flow chart that illustrates a process that may be performed in the systems 300 and 400 according to aspects of the present disclosure. In particular, the process illustrated in FIG. 9 is concerned with receipt, processing and execution of a telephone order by a merchant. The view of system 400 as presented in FIG. 4 is particularly relevant.

At 902 in FIG. 9 (and also referring to FIG. 4), the user 103 operates his/her smartphone 406 (or a conventional landline phone, not shown) to initiate a telephone call 402 that is received by a merchant call center CSR 404. (As noted above, the CSR is engaged in operating and responding to a call center workstation 408).

At 904 in FIG. 9, the user 103 selects one or more items to purchase (e.g., from a catalog issued by the merchant or items described by the CSR directly) and orally informs the CSR 404 of those items during the telephone call 402. (In other situations, the user 103 may be calling a service provider—e.g., a utility company, a mobile phone carrier—to settle a pending bill. In either or both situations, the CSR may have obtained information from the user as needed to operate the workstation to locate the user's data record in the merchant's computer files.)

At 906, in lieu of providing a payment account number, the user 103 may orally (or by keypad entry) provide to the merchant—during the telephone call 402—the user's credentials service customer identifier, as assigned to the user in the registration process described above in connection with FIG. 8. If the customer identifier was provided orally, the CSR may enter it into the merchant backend server computer 410 via operation of the workstation 408 and in conjunction with confirming with the user 103 that the CSR 404 has correctly heard and comprehended the user's customer identifier.

At 908, the merchant backend server computer 410 transmits a request for payment credentials to the credentials service server computer 302. The request includes the credentials service customer identifier provided by the user 103 to the merchant at step 906. Possibly the request also includes or initiates suitable security procedures to confirm that the merchant is legitimate and not an impostor or fraudster.

At 910, the credentials service server computer 302 receives the request for payment credentials from the merchant backend server computer 410.

At 912, the credentials service server computer 302 uses the customer identifier included in the request to look up the entry in the database 306 (FIG. 4) for the user 103. The data entry (as will be appreciated from previous discussion) includes electronic messaging contact information for the user 103.

At 914, the credentials service server computer 302 generates a one-time password (OTP) to be used to challenge the user 103. In some embodiments, the OTP may be in the format of a typical PIN (personal identification number).

At 916, the credentials service server computer 302 uses contact information obtained at 912 (user's email address or mobile telephone number, or both) to transmit the OTP to the user 103. This may occur via the email/SMS gateway 310 (FIG. 4) and via the user's smartphone 406 or via a PC/laptop computer/tablet computer 414 available to the user 103. (In some cases the user 103 may phone the merchant via a landline while sitting at his/her PC, ready to receive a message from the credentials service server computer 302).

At 918 in FIG. 9, the user sends the OTP back to the credentials service server computer 302 to authenticate/approve the telephone order purchase transaction. For example, the user 103 may use his/her PC 414 (or the browser/app on his/her smartphone 406) to log on to a website hosted by the credentials service server computer 302 to enter the OTP. Alternatively, entering the OTP by the user 103 into the credentials service app (block 511, FIG. 5) in the user's smartphone 406 may cause the OTP to be transmitted back to the credentials service server computer 302 by the smartphone 406.

At 920, the credentials service server computer 302 may verify that the OTP has been correctly entered/sent back by the user 103. The subsequent transmittal of the payment credentials to the merchant from the credentials service server computer 302 may be part of the response by the credentials service server computer 302 to the verification of the returned OTP.

At 922, in some embodiments, the user may be prompted to designate how many uses of the payment credentials are to be authorized by the credentials service server computer 302 for the merchant with whom the user is engaging in the telephone order purchase transactions. Typical options may be one-use-only, or—in the case of authorizing a monthly payment to a service provider—the user may designate 12 uses of the payment credentials to arrange for a recurring payment over a year's period of time. Other numbers of designated authorized uses may be possible. In response to the prompting by the credentials service server computer 302, the user 103 may make the designation of the number of authorized uses. It will be appreciated that the credentials service server computer 302 (and subsequently, the merchant) may store the number of authorized uses, and the credentials service server computer 302 may track usage of the credentials by the merchant to see that the number of authorized uses is not exceeded. Alternatively, the credentials service server computer 302 may communicate the number of permitted uses to the token service provider (block 204, FIG. 2), for enforcement by the token service provider.

In some use cases (e.g., when more than one payment account is associated with the user's registration), the credentials service server computer 302 may also permit the user to select among the available payment accounts for use in connection with the current telephone order transaction. The user may respond by selecting his/her desired payment account for use in the transaction. Alternatively, a default payment account may be automatically selected by the credentials service server computer 302 for use in the current transaction.

At 924 in FIG. 9, the credentials service server computer 302 may securely transmit/provide tokenized payment credentials to the merchant backend server computer 410 to allow the merchant to use the payment credentials for a payment account transaction to settle the current telephone order transaction. The tokenized payment credentials may include a payment token (typically in the format of a PAN) and a unique security code (e.g. a three digit code, sometimes called a "CVC2") as well as an expiry date. With payment credentials provided to the merchant backend server computer 410 in this format, the payment processing performed by the merchant backend server computer 410 may proceed in essentially the same manner as if the user had provided a typical conventional set of payment credentials, thus minimizing any impact on the merchant's payment infrastructure. The provision of payment credentials from the credentials service server computer 302 in this way also promotes security from the user's and account issuer's point of view, in that the merchant never has possession of the actual account number, so that the risk of compromise of particularly sensitive information is reduced or eliminated. Another security benefit accrues with the limited-use/one-time-use stipulation for the payment token, so that it cannot be used beyond the user's designated number of uses. Also, as will be understood by those who are familiar with the topic of tokenization, the payment token would not be useable by a wrongdoer for the purpose of creating a counterfeit physical payment card.

At 926 in FIG. 9, the merchant backend server computer 410 may generate an essentially conventional payment account transaction authorization request message, as is known by those skilled in the art, using the payment credentials received by the merchant backend server computer 410 from the credentials service server computer 302 at 924.

At 928, the merchant backend server computer 410 may transmit the authorization request messages to the payment gateway 412, which in turn routes the messages to the payment network 110, for ultimate routing to the account issuer 112 (FIG. 4). As again will be familiar to those well acquainted with the concept of tokenization in payment account systems, the routing of the authorization request to the account issuer may include a "detour" to the token service provider for "detokenization"—i.e., translation of the payment token into the relevant payment account number. At 930, the transaction may be completed in an essentially conventional manner, including receipt and handling of the authorization request message by the account issuer, and transmittal of the authorization response message from the account issuer for routing back to the merchant backend server computer 410.

With the security features described above, otherwise reluctant phone order customers may use the credentials service described herein with confidence in placing telephone purchase orders, making telephone payments to service providers, etc. Thus the credentials service described herein may increase usage of telephone-based purchase and payment channels and may provide improved convenience for consumers and expanded marketing and customer service opportunities for merchants and service providers.

As used herein and in the appended claims, making a "purchase order" includes both ordering goods for purchase and authorizing payment of a pending or yet-to-be-issued bill.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather, the method steps may be performed in any order that is practicable, including simultaneous performance of steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:

receiving a purchase order via a telephone call from a customer;

as part of the telephone call, receiving from the customer a credentials service customer identifier assigned to the customer, said receiving the credentials service customer identifier including receiving the credentials service customer identifier orally;

transmitting a message to a credentials service that issued the customer identifier;

receiving payment credentials from the credentials service, the received payment credentials including a payment token that is associated with a payment account that belongs to the customer;

generating a payment account system authorization request message, the payment account system authorization request message including the payment token; and transmitting the payment account system authorization request message for routing to an issuer of the payment account.

2. The method of claim 1, further comprising:

receiving, from the credentials service, a designation of a number of transactions for which the payment token may be used.

3. The method of claim 2, further comprising:

storing a data entry indicative of said received designated number of transactions.

\* \* \* \* \*